June 5, 1934.  J. G. GORDON  1,961,349
RECIPROCATING MECHANISM
Filed Jan. 13, 1932  3 Sheets-Sheet 1
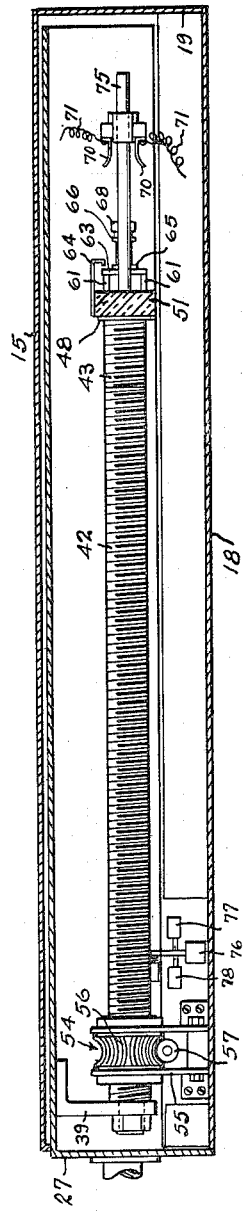
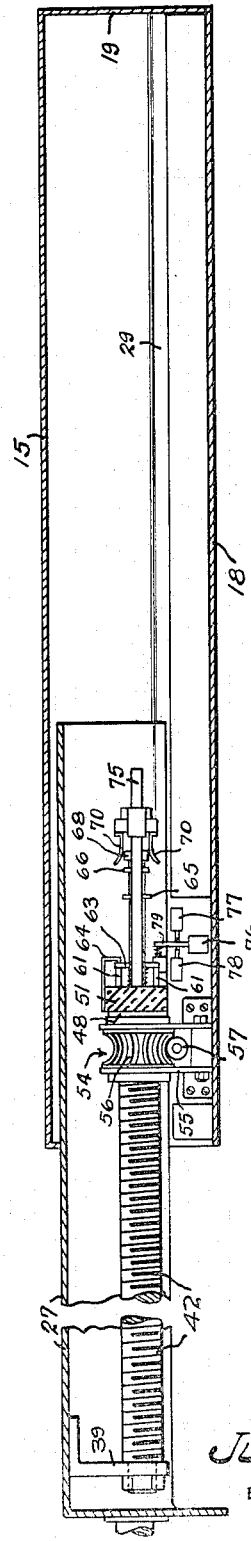
INVENTOR
Julius G. Gordon
BY Fred G. Matheny
ATTORNEY June 5, 1934.   J. G. GORDON   1,961,349
RECIPROCATING MECHANISM
Filed Jan. 13, 1932   3 Sheets-Sheet 2
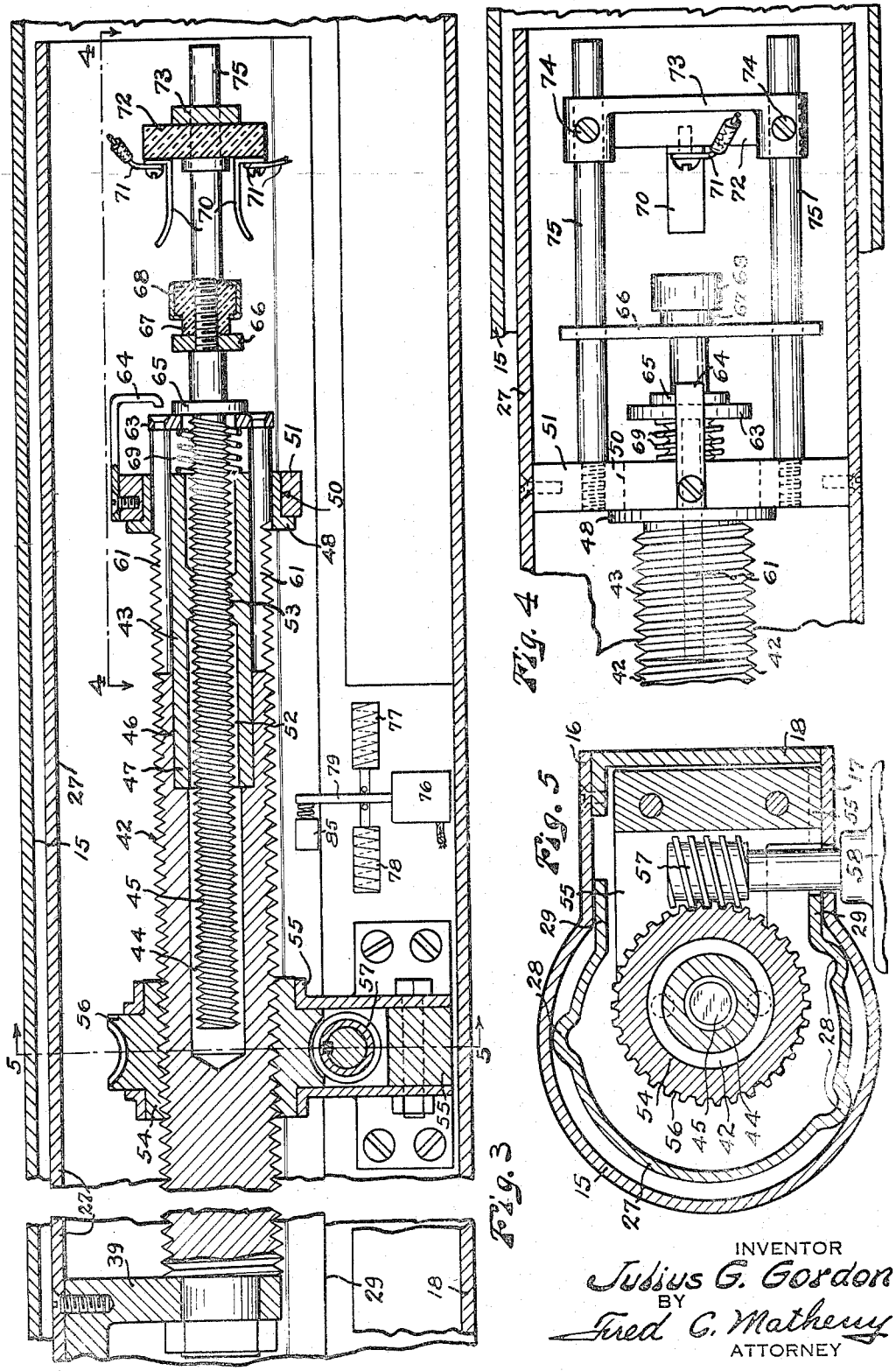
INVENTOR
Julius G. Gordon
BY
Fred C. Matheny
ATTORNEY June 5, 1934.  J. G. GORDON  1,961,349
RECIPROCATING MECHANISM
Filed Jan. 13, 1932  3 Sheets-Sheet 3

INVENTOR
Julius G Gordon
BY
Fred C. Matheny
ATTORNEY

Patented June 5, 1934

1,961,349

UNITED STATES PATENT OFFICE 1,961,349

RECIPROCATING MECHANISM

Julius G. Gordon, Yakima, Wash., assignor of one-fourth to Peter Meinardi, Yakima, Wash.

Application January 13, 1932, Serial No. 586,294

16 Claims. (Cl. 74—14)

My invention relates to power operated devices for producing intermittent reciprocating movement, and the primary object of my invention is to provide a reliable and efficient device by which any mechanical part may be moved to one position and there held immovable for a predetermined period of time and then retracted, said devices being adapted to repeat this series of movements as long as desired.

In my co-pending application Ser. No. 586,295 of even date herewith I have shown this power operated device applied to a signal arm for use on motor vehicles, but it will be understood that the same may be used for many different purposes to secure reciprocatory, start and stop, movement.

Another object of this invention is to secure reciprocatory start and stop movement of this nature by means of screw devices.

Another object is to provide means for varying the time element or period of rest between the outward and return movement, at will.

Another object is to provide means for automatically reversing the direction of rotation of the driving devices during the period of rest and while the reciprocatory member is in extended position.

Other objects will be apparent from the following description.

In the drawings Figure 1 is a longitudinal section with parts in elevation, of apparatus embodying my invention, the reciprocatory member being fully retracted.

Fig. 2 is a similar view showing the reciprocatory member fully extended but partly broken away, and showing the contact means in reversing contact position.

Fig. 3 is a fragmentary sectional view on a larger scale of the working parts of the device.

Fig. 4 is a view substantially on line 4—4 of Fig. 3.

Fig. 5 is a cross section substantially on line 5—5 of Fig. 3.

Like reference numerals designate like parts in the drawings.

Figure 6:
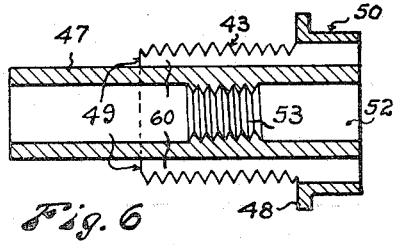
Figs. 6 and 7 are detached views in longitudinal section and end elevation, respectively, of an extension screw.
Figure 7:
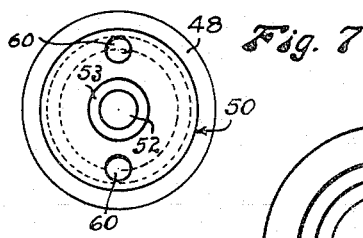
Figure 10:
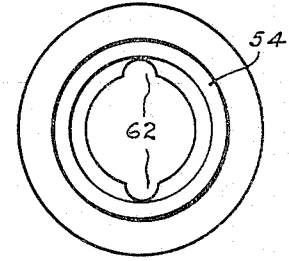
Fig. 10 is an end elevation of a combined driving nut and worm.
Figure 9:
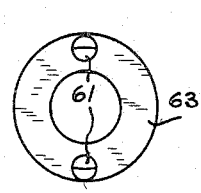
Figs. 8 and 9 are detached views in side elevation and end elevation, respectively, of a nut locking member.
Figure 8:
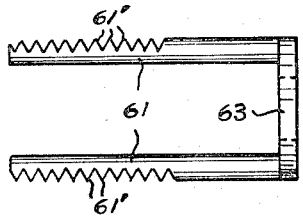

Various forms of mounting means may be used for this device. One of said mountings may be in the form of a housing 15, having a portion of arcuate cross section approximately two hundred forty degrees in extent. At the extremities of this arcuate portion are two outwardly extending, parallel, spaced apart flanges 16 and 17. A cover 18 is fitted between said flanges and an end member 19 closes one end of said housing. A movable member 27 is slidably and reciprocably disposed within the housing 15 and projects from the end of said housing opposite to the end wall 19. The cross sectional shape of the movable member 27 is similar to that of the housing 15 but said movable member is of smaller diameter than the housing 15 and preferably has three longitudinal bearing tracks 28 protruding outwardly therefrom. The movable member 27 is open along one side and has narrow flat flanges along the open side which engage the housing flanges 16 and 17 and prevent rotation of the movable member within the housing 15.

The reciprocatory mechanism which constitutes this invention comprises a main screw 42, having one end fixedly and non-rotatably connected, as by a bracket 39 with the movable member 27. The other end of the non-rotatable screw 42 has an extension screw 43 rotatably connected therewith. The extension screw 43 has an external thread corresponding in diameter, shape and pitch to the thread on the main screw 42 so that a nut may run freely and smoothly from one of said screws to the other, as hereinafter set forth. The inner end of the non-rotatable screw 42 is axially bored, as at 44 to afford clearance for a reversing screw 45, and is counterbored as at 46, to form a bearing for a cylindrical shank 47 on one end of the extension screw 43. The shank 47 is of smaller diameter than the extension screw leaving a shoulder 49 for engagement with the end of the non-rotatable screw 42. The extension screw 43 has a collar 48 near its other end and said extension screw terminates in a bearing portion 50 rotatably supported in a bracket 51 which is secured to the movable member 27. The extension screw 43 is axially bored as at 52 to permit the passage therethrough of the reversing contact screw 45 and this bore 52 is internally threaded as at 53 for engagement with the threads on the exterior of the reversing screw. To reduce friction I prefer to make the threaded section 53 short but it is apparent that the entire length of the bore 52 may be threaded if desired. The direction of the thread on the reversing screw 45 is left hand while that of the main fixed screw is right hand in the apparatus shown.

The screw assembly together with the movable member 27 are adapted to be moved lengthwise relative to a fixed member or housing 15 by a nut 54 which is threaded on the screws 42—43 and is rotatably supported by bearing bracket means 55 which is rigidly mounted on the fixed member 15. A worm wheel 56 is provided on the exterior of said nut and a worm 57 on the driven shaft of a reversible motor 58 meshes with said worm wheel for rotating the nut. When the nut is rotated it is obvious that the screw assembly and all parts connected therewith will be moved longitudinally unless the said nut is completely and entirely on the extension screw 43, as shown in Fig. 2, in which instance said extension screw will be turned without moving the screw assembly longitudinally as hereinafter described.

Figure 11:
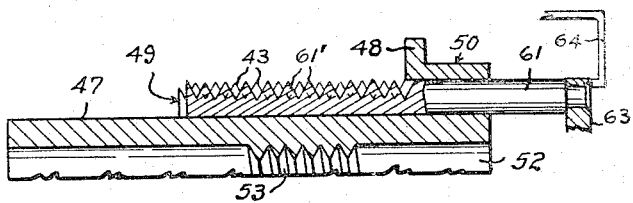
Fig. 11 is a fragmental section showing thread means in locking position.

Means are provided for locking the nut 54 to the extension screw so that these two parts will be rotated together. The locking means herein illustrated contemplates relatively moving two parts of said extension screw so that thread sections on the moved part will obstruct the thread grooves of the other part and form locking means for the nut. I have accomplished this by boring one or more longitudinal cylindrical grooves 60 in the peripheral portion of the extension screw, said grooves being substantially tangent to the apex portions of the threads. Within each of these grooves 60 I provide a longitudinally movable pin or locking member 61 having sections of thread 61' on the exterior thereof which register accurately with the threads of the extension screw when the pins are moved into the grooves 60 as far as they will go. When the pins 61 are retracted or moved to the right Fig. 11, they will be positioned so that they will obstruct the grooves of the threads on the extension screw and prevent rotation of the nut 54 thereon. The nut 54 is provided with internal grooves 62 in the threaded portion thereof in locations corresponding to the location of the pins 61, which grooves are occupied by the thread sections of the pins when said thread sections are in locking position. In this disclosure I have shown two of the pins 61 positioned diametrically opposite to each other and connected at their outer end by a washer like yoke 63. A stop member 64 which is rigidly secured to the bearing bracket 51 limits the outward movement of the yoke 63, preferably to an amount equal to one half of the distance between two successive threads on the main screw.

The reversing screw 45 is supported against rotation by a cross piece 66 on said screw which is slidably engaged with guide rods 75, said cross piece 66 permitting free longitudinal movement of the reversing screw 45. A relatively fixed collar or flange 65 is provided on the reversing screw for engagement with the washer member 63 which carries the locking pins 61 whereby said locking pins may be moved to unlocked position and held in unlocked position against the pressure of a spring 69, as the reversing screw 45 is retracted.

The protruding end of the reversing screw 45 has a knob or nut 67 of insulating material thereon and said knob carries a conductor member 68 which is adapted to engage with two spring switch terminals 70 and close an electric circuit through circuit wires 71. The contact member 68 may be a metal jacket around the knob 67. The terminals 70 are mounted on a block 72 of insulating material which is carried on a cross bar 73. The cross bar 73 is adjustably supported, as by screws 74 on two track rods 75 which track rods extend outwardly from the bracket 51. By adjusting the position of the cross bar 73 closer to, or farther away from, the location where the contact member 68 stops in its position of rest it is possible to vary the length of time that the main screw 42 will remain stopped after it has been moved to the left and before it is again retracted or moved to the right.

Figure 12:
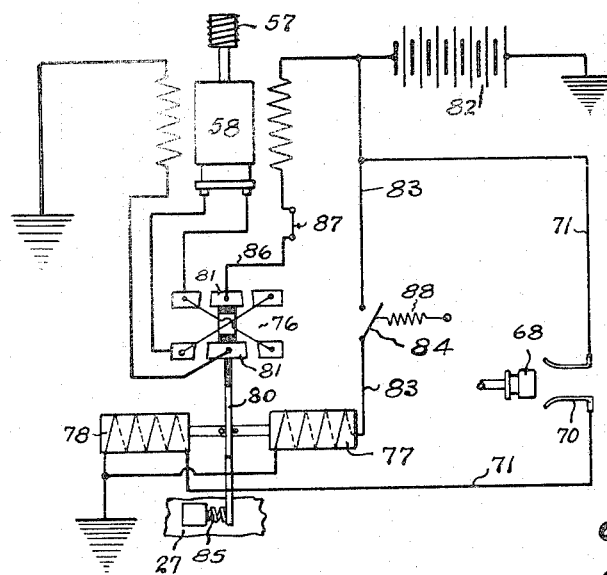
Fig. 12 is a wiring diagram showing motor and reversing switch connections.

The motor 58, Fig. 12, is of the reversible type and the operation of said motor is governed by a reversing switch 76. The closing and reversing of the switch 76 is controlled by a starting electromagnet 77 and a reversing electromagnet 78, which are connected with a lever 80 by which the movable part 81, of said reversing switch is operated. Starting electromagnet 77 is connected with a source of supply of electric current 82, by a circuit wire 83. A control switch 84, which may be either manually or automatically operated, is interposed in circuit wire 83. The terminals 70 are respectively connected by the wires 71 with the source of current 82 and the motor reversing solenoid 78 in such a manner that the terminals 70 and contactor 68 form a normally, open switch between source of current 82 and electromagnet 78. A switch operating member 85 which is carried on the movable member 27 is adapted to engage the arm 79 of the reversing switch 76 and move the reversing switch into a neutral position thus breaking the current to the motor. Current is supplied to the reversing switch through a circuit wire 86 and a manually operated switch 87 may be provided in this circuit wire 86. By opening the switch 87 the motor circuit may be broken at any time and the parts of the reciprocating mechanism held in any desired position for any desired length of time, the interrupted cycle of movement being completed when the switch 87 is again closed.

To operate this device the main control switch 84, which may normally be held open by a spring 88 is momentarily closed thus momentarily completing a circuit from the battery 82 to the starting electromagent 77. This moves the reversing switch 76 into a correct position to supply current for driving the motor 58 in a forward direction. This will rotate the nut 54 and move the screw 42 together with the movable member 27 to the left, as seen in the drawings. The limit of this movement being reached when the flange 48 of the screw member 43 encounters the end of the nut 54. At this instant the nut 54 will be completely on the extension screw 43 and clear of the threads of the main screw 42. The extension screw 43 will then begin to turn and the reversing screw 45 will begin to move to the right. This releases the locking pins 61 and the spring 69 will move said locking pins and the washer member 63 to the right until the washer member encounters the stop 64. This will cause the thread sections on the locking pins to obstruct the thread grooves of the screw 43 and positively lock the nut 54 to the extension screw 43, it being understood that the grooves 62 in the thread portion of the nut 54 will register with the locking pins 61 at the instant the end of the nut 54 jams against the shoulder 48 and the extension screw begins to turn. As the extension screw 43 continues to rotate the reversing screw 45 is moved to the right, Fig. 2, until the contactor 68 bridges the gap between the terminals 70 and closes the circuit between the source of current 82 and the reversing electromagnet 78, whereupon the reversing switch 76 will be moved to reverse the motor 58. This reverses the direction of rotation of the extension screw 43 and begins to retract the reversing screw 45. As the reversing screw 45 approaches the fully retracted position the collar 65 thereon engages the washer member 63 and moves the locking pins 61 inwardly thus simultaneously releasing the nut 54 and stopping the longitudinal movement of the reversing screw, whereupon the nut 54 begins to move both screw members 42 and 43 to the right. The jamming of the collar 65 against the washer member 63 frictionally locks the several screw members 42, 43 and 45 together so that no further rotation of the extension screw 43 occurs but longitudinal movement of all of said screw members in a retractile direction begins. When this locking occurs the threads on the main screw member 42 and the extension screw 43 are accurately registered and the nut 54 will pass readily and easily from the extension screw onto the main screw without jamming.

The period of time during which the reversing screw is being moved outwardly to make reversing contact and then retracted to the neutral position represents the time that the reciprocatory mechanism will stand in its outermost fixed position. This time may be varied by varying the distance of the contacts 70 from the inoperative or retracted position of the contactor 68.

When the movable member is fully retracted the spring plunger 85 on said member will engage with and move the arm 79 which is connected with the reversing switch 76 of the motor and the circuit through said reversing switch will be broken thus stopping the motor. Engagement of the spring plunger 85 with the switch arm 79 will not prevent closing of the reversing switch 76 for forward operation the next time the electromagnet 77 is energized. In the drawings I have shown an ordinary tapered thread on the main screw 42 and the extension screw 43 but it will be understood that an acme thread or a square thread or various other types of thread may be used and that this thread may be varied in pitch depending on the work for which the device is designed.

This device is durable and efficient in operation, capable of very fine adjustment and may be adapted to many uses where reciprocatory start and stop movement of this nature is required.

The foregoing description and accompanying drawings clearly disclose a preferred embodiment of my invention but it will be understood that this disclosure is merely illustrative and that such changes in the invention may be made as are fairly within the scope and spirit of the following claims.

I claim:

1. In a reciprocable device of the class described; a non-rotatable main screw; an extension screw rotatably connected with one end of said main screw, and a rotatably driven longitudinally non-movable nut operable on both said main screw and said extension screw, said extension screw being rotatable with said nut when said nut is on the extension screw and clear of the main screw.

2. In a reciprocable device of the class described; a non-rotatable main screw; an extension screw rotatably connected with one end of said main screw; a rotatably driven longitudinally non-movable nut operable on both said main screw and said extension screw, said extension screw being rotatable with said nut when said nut is on the extension screw and clear of the main screw, and means for reversing the direction of rotation of said nut.

3. In a reciprocable device of the class described; a non-rotatable main screw; an extension screw rotatably connected with one end of said main screw; a rotatably driven longitudinally non-movable nut operable on both said main screw and said extension screw, said extension screw being rotatable with said nut when said nut is on the extension screw and clear of the main screw, and means for locking said nut on said extension screw.

4. In a reciprocable device of the class described; a non-rotatable main screw; an extension screw rotatably connected with one end of said main screw; a rotatably driven longitudinally non-movable nut operable on both said main screw and said extension screw, said extension screw being rotatable with said nut when said nut is on the extension screw and clear of the main screw; and releasable means in the interfitting thread portions of said nut and said extension screw for locking said nut and said extension screw against relative rotation.

5. In a reciprocable device of the class described; a non-rotatable main screw; an extension screw rotatably connected with one end of said main screw; a rotatably driven longitudinally non-movable nut operable on both said main screw and said extension screw, said extension screw being rotatable with said nut when said nut is on the extension screw and clear of the main screw; releasable means for locking said nut and said extension screw against relative rotation, and means for reversing the direction of rotation of said nut.

6. In a reciprocable device of the class described; a non-rotatable main screw; an extension screw rotatably connected with one end of said main screw; a rotatably driven longitudinally non-movable nut operable on both said main screw and said extension screw, said extension screw being rotatable with said nut when said nut is on the extension screw and clear of the main screw, means for locking said extension screw and said nut together for rotation, devices for releasing said locking means at the end of a predetermined period of operation and means for reversing the direction of rotation of said nut.

7. In a reciprocable device of the class described; a non-rotatable main screw; an extension screw rotatably connected with one end of said main screw; a rotatably driven longitudinally non-movable nut operable on both said main screw and said extension screw, said extension screw being rotatable with said nut when said nut is on the extension screw and clear of the main screw, and a locking member carrying a portion of the threads of said extension screw and movable relative to said extension screw, whereby said nut and said extension screw may be locked against relative rotation.

8. In a reciprocable device of the class described; a non-rotatable main screw; an extension screw rotatably connected with one end of said main screw; a rotatably driven longitudinally non-movable nut operable on both said main screw and said extension screw, said extension screw being rotatable with said nut when said nut is on the extension screw and clear of the main screw, a locking member extending into the threaded portion of said extension screw and having thread sections thereon, said nut having grooves in the threads thereof arranged to register with said locking member, and means for moving said locking member whereby said thread sections may be caused to obstruct or to register with the threads of said extension screw to thereby lock or release said nut for rotary movement relative to said extension screw.

9. In a reciprocable device of the class described; a non-rotatable main screw; an extension screw rotatably connected with one end of said main screw; a rotatably driven longitudinally non-movable nut operable on both said main screw and said extension screw, said extension screw being rotatable with said nut when said nut is on the extension screw and clear of the main screw, reversible driving means connected with said nut; a reversing member operated by rotation of said extension screw, and means operated by said reversing member for reversing the direction of rotation of said driving means.

10. In a reciprocable device of the class described; a non-rotatable main screw; an extension screw rotatably connected with one end of said main screw; a rotatably driven longitudinally non-movable nut operable on both said main screw and said extension screw, said extension screw being rotatable with said nut when said nut is on the extension screw and clear of the main screw, reversible driving means connected with said nut; a reversing member longitudinally movable by rotation of said extension screw; and reversing means connected with said driving means and controlled by said reversing member.

11. In a reciprocable device of the class described; a non-rotatable main screw; an extension screw rotatably connected with one end of said main screw; a rotatably driven longitudinally non-movable nut operable on both said main screw and said extension screw, said extension screw being rotatable with said nut when said nut is on the extension screw and clear of the main screw, said main screw remaining stationary while said extension screw is being rotated; reversible driving means connected with said nut; a reversing screw having screw thread connection with said extension screw whereby said reversing screw may be moved longitudinally by rotation of said extension screw; reversing means for said driving means, and a control for said reversing means adjustably supported in the path of movement of said reversing screw and operated by said reversing screw.

12. In a device of the class described; a main screw having an axial passage extending from one end inwardly, said axial passage being counter-bored adjacent the end of the screw to afford a bearing; an extension screw having an external thread corresponding in diameter, shape and pitch to the thread on said main screw and registering with said main screw thread, said extension screw having an axial bore provided with internal threads; a shank of reduced diameter on the end of said extension screw rotatably journaled within the counterbore in said main screw; an annular shoulder beyond the thread on said extension screw; a bearing on said extension screw beyond said shoulder; frame means supporting said bearing; a longitudinally movable reversing screw axially disposed within said main screw and said extension screw and having threaded engagement with said extension screw; means holding said reversing screw against rotation; a nut operable on said main screw and said extension screw, the length of the threaded portion of said extension screw being equal to the length of the threaded portion of said nut; means for locking said nut and said extension screw together for simultaneous rotation; devices connected with said reversing screw for releasing said nut locking means; relatively fixed bearing means for said nut; reversible means having a driving connection with said nut, and means controlled by the reversing screw for reversing the direction of rotation of said driving means.

13. In a device of the class described; a main screw; an extension screw, rotatably connected with one end of said main screw and having an external thread corresponding in diameter, shape and pitch to the thread on said main screw and registering with said main screw thread; said extension screw having grooves in the threaded portion thereof parallel to the axis of said extension screw and substantially tangent to the apex portions of the threads of said extension screw; nut locking members slidably disposed within said grooves and having thread sections arranged to register with or to obstruct the threads of said extension screw; a spring urging said nut locking members outwardly into thread obstructing position; means limiting the outward movement of said nut locking members; a longitudinally movable reversing screw having threaded engagement with said extension screw; means holding said reversing screw against rotation; engaging means on said reversing screw whereby said nut locking members are held in thread registering position; a nut operable on said main screw and said extension screw, said nut having internal grooves in the thread portion thereof arranged to register with said nut locking members, the length of the threaded portion of said extension screw being equal to the length of the threaded portion of said nut; relatively fixed bearing means for said nut; reversible means having a driving connection with said nut, and means controlled by said reversing screw for reversing the direction of rotation of said driving means.

14. In a device of the class described; a main screw; an extension screw rotatably connected with said main screw and having an external thread corresponding in diameter, shape and pitch to the thread on said main screw and registering with said screw thread; an annular shoulder beyond the thread on said extension screw; said extension screw having holes extending through said shoulder portion, said holes forming grooves in the threaded portion of said extension screw and being parallel to the axis of said extension screw and substantially tangent to the apex portions of the threads thereof; pins slidable within said holes and said grooves and having thread sections arranged to register with or to obstruct the threads of said extension screw; resilient means urging said pins outwardly into thread obstructing position; stop means limiting the outward movement of said pins; a longitudinally movable reversing screw axially disposed within said main screw; and said extension screw and having threaded engagement with said extension screw means holding said reversing screw against rotation; pin engaging means on said reversing screw whereby said pins are held in thread registering position; a nut operable on said main screw and said extension screw, said nut having internal grooves in the thread portion thereof arranged to register with said pins, the length of the threaded portion of said extension screw being equal to the length of the threaded portion of said nut; relatively fixed bearing means for said nut; reversible means having a driving connection with said nut, and means controlled by the reversing screw for reversing the direction of rotation of said driving means.

15. In a device of the class described; a main screw having an axial passage extending from one end inwardly, said axial passage being counterbored adjacent the end of the screw to afford a bearing; an extension screw having an external thread corresponding in diameter, shape and pitch to the thread on said main screw and registering with said main screw thread, said extension screw having an axial bore provided with internal threads; a shank of reduced diameter on the end of said extension screw and rotatably journaled within the counterbore in said main screw; a bearing portion adjacent the outer end of said extension screw; a shoulder adjacent said bearing portion; said extension screw having a hole extending through said bearing portion and said shoulder portion, said hole forming a groove in the threaded portion of said extension screw and being parallel to the axis of said extension screw and substantially tangent to the apex portions of the threads thereof; a pin slidably disposed within said hole and said groove and having thread sections arranged to register with or to obstruct the threads of said extension screw; a spring urging said pins outwardly into thread obstructing position; means limiting the outward movement of said pins; a longitudinally movable reversing screw axially disposed within said main screw and said extension screw and having threaded engagement with said extension screw; means holding said reversing screw against rotation; pin engaging means on said reversing screw whereby said pins are held in thread registering position; a nut operable on said main screw and said extension screw, said nut having an internal groove in the thread portion thereof arranged to register with said pin, the length of the threaded portion of said extension screw being equal to the length of the threaded portion of said nut; relatively fixed bearing means for said nut; reversible means having a driving connection with said nut, and means controlled by said reversing screw for reversing the direction of rotation of said driving means.

16. In a device of the class described; a main screw having an axial passage extending from one end inwardly, said axial passage being counterbored adjacent the end of the screw to afford a bearing; an extension screw having an external thread corresponding in diameter, shape and pitch to the thread on said main screw and registering with said main screw thread, said extension screw having an axial bore provided with internal threads; a shank of reduced diameter on the end of said extension screw rotatably journaled within the counterbore in said main screw; an annular shoulder beyond the thread on said extension screw; a bearing portion on said extension screw adjacent said shoulder said extension screw having one or more holes extending through said bearing portion and said shoulder portion, said holes forming grooves in the threaded portion of said extension screw and being parallel to the axis of said extension screw and substantially tangent to the apex portions of the threads thereof; pins slidably disposed within said holes and said grooves and having thread sections arranged to register with or to obstruct the threads of said extension screw; a spring urging said pins outwardly into thread obstructing position; means limiting the outward movement of said pins; a longitudinally movable reversing screw axially disposed with said main screw and said extension screw and having threaded engagement with said extension screw; means holding said reversing screw against rotation; pin engaging means on said reversing screw whereby said pins are held in thread registering position; a nut operable on said main screw and said extension screw, said nut having internal grooves in the thread portion thereof arranged to register with said pins, the length of the threaded portion of said extension screw being equal to the length of the threaded portion of said nut; relatively fixed bearing means for said nut; reversible means having a driving connection with said nut, and means controlled by said reversing screw for reversing the direction of rotation of said driving means.

JULIUS G. GORDON.